(12) United States Patent
Yokomizo

(10) Patent No.: US 11,641,435 B2
(45) Date of Patent: May 2, 2023

(54) IMAGE FORMING APPARATUS TO ALLOW A USER TO CHECK A CARTRIDGE REPLACEMENT PROCEDURE

(71) Applicant: CANON KABUSHIKI KAISHA, Tokyo (JP)

(72) Inventor: So Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/068,595

(22) Filed: Oct. 12, 2020

(65) Prior Publication Data

US 2021/0120136 A1 Apr. 22, 2021

(30) Foreign Application Priority Data

Oct. 18, 2019 (JP) .............................. JP2019-191580

(51) Int. Cl.
*H04N 1/00* (2006.01)

(52) U.S. Cl.
CPC ..... *H04N 1/00546* (2013.01); *H04N 1/00503* (2013.01); *H04N 1/00551* (2013.01)

(58) Field of Classification Search
None
See application file for complete search history.

(56) References Cited

U.S. PATENT DOCUMENTS

| | | | | |
|---|---|---|---|---|
| 2010/0272452 A1* | 10/2010 | Tsukijima | .......... | G03G 21/1633 399/27 |
| 2010/0329704 A1* | 12/2010 | Tachibana | .......... | G03G 15/0855 399/27 |
| 2011/0058825 A1* | 3/2011 | Tsukijima | .......... | G03G 21/1633 399/27 |
| 2013/0278663 A1* | 10/2013 | Sugimoto | .............. | B41J 11/008 347/14 |
| 2015/0092209 A1* | 4/2015 | Miyake | .............. | H04N 1/00891 358/1.13 |
| 2018/0089016 A1* | 3/2018 | Tachibana | ........... | G06F 11/0769 |
| 2019/0094075 A1* | 3/2019 | Ikeda | ....................... | G01J 3/457 |
| 2020/0057407 A1* | 2/2020 | Fukata | ............... | G03G 15/5016 |

FOREIGN PATENT DOCUMENTS

JP 2011-008142 A 1/2011

* cited by examiner

*Primary Examiner* — Dung D Tran
(74) *Attorney, Agent, or Firm* — Canon U.S.A., Inc. I.P. Division

(57) ABSTRACT

An image forming apparatus, to form an image on a recording material using a recording agent supplied from a container detachably mounted to the image forming apparatus, includes a cover configured to cover a region in which the container is stored. A display instruction is received from a user to display a procedure for replacing the container. A display unit is caused to display the container replacing procedure based on receiving the display instruction. In a case where it is determined that the container replacing procedure is displayed on the display unit, performing control includes performing control to prevent a notification, prompting the user to close the cover, from being issued even if the cover is opened.

19 Claims, 13 Drawing Sheets

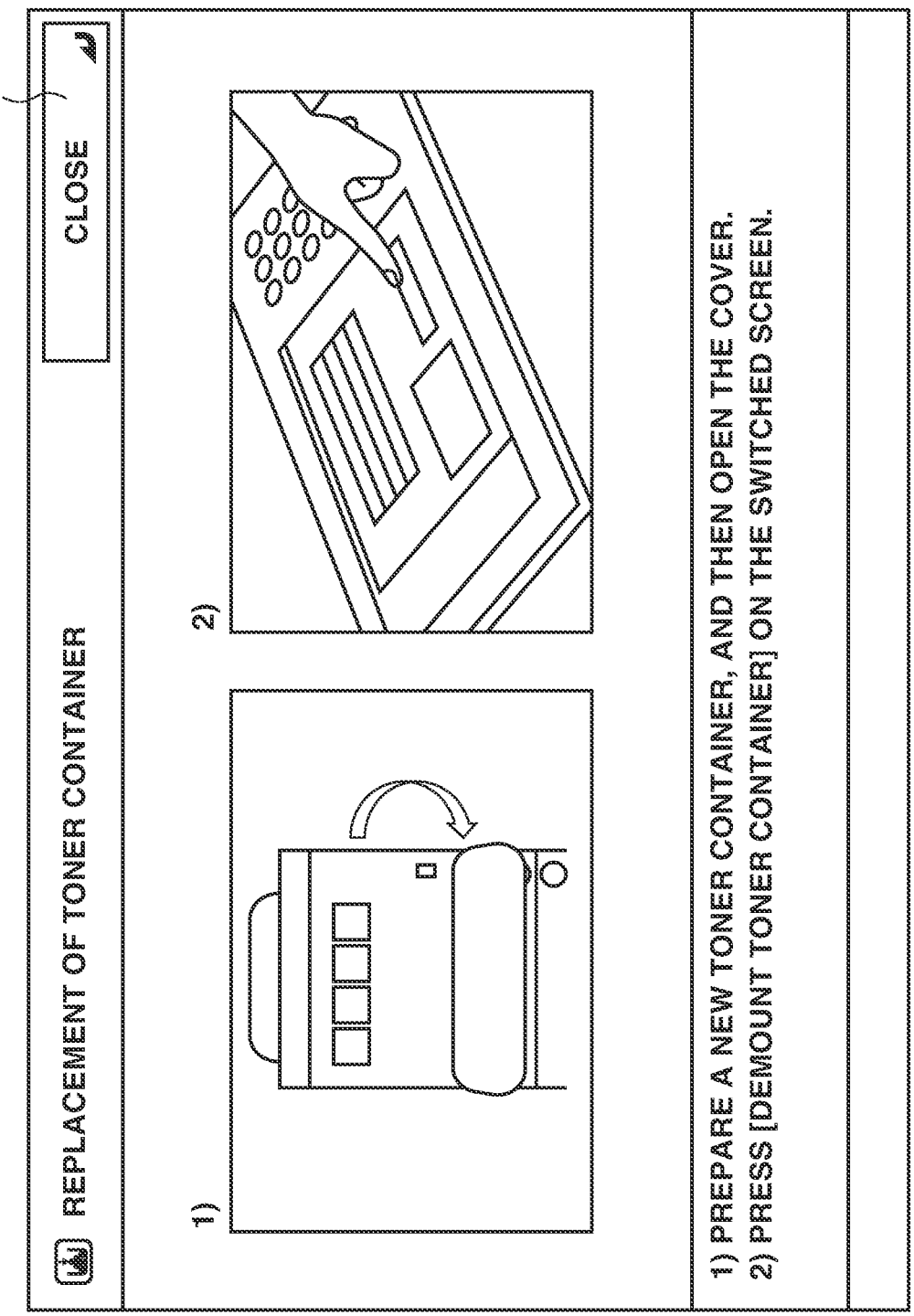

IMAGE FORMING APPARATUS TO ALLOW A USER TO CHECK A CARTRIDGE REPLACEMENT PROCEDURE

BACKGROUND

Field

The present disclosure relates to an image forming apparatus, a control method of the image forming apparatus, and a storage medium.

Description of the Related Art

Typical image forming apparatuses, such as printers, copying machines, and facsimiles, are provided with cartridges storing recording agents, such as toner and ink, and form images on sheets with the recording agents supplied from the cartridges. If a remaining amount of the recording agent in a cartridge becomes low, a user demounts the cartridge from the image forming apparatus and mounts a new cartridge therein, and thus the recording agent can be replenished.

Generally, some image forming apparatuses are known to display a way to replace a cartridge on an operation unit in a case where a recording agent amount in a cartridge becomes low. The way to replace the cartridge is displayed on the operation unit, and thus the user can replace the cartridge.

A user or an operator sometimes wants to replace a cartridge regardless of a remaining amount of a recording agent in the cartridge, for example, before the user outputs a large amount of printed materials and in a case where a service person performs maintenance work. Thus, the user may want to know a cartridge replacement procedure regardless of the remaining amount of the recording agent in the cartridge in some cases.

According to Japanese Patent Application Laid-Open No. 2011-8142, a cartridge replacement procedure can be displayed on an operation unit with a user instruction even in a case where a remaining amount of toner in a cartridge is not low.

An image forming apparatus is provided with parts, such as a developing unit and a photosensitive drum, in a replaceable manner in addition to a cartridge. These parts are usually covered by covers, and the user replaces a part by opening the cover when the part is replaced.

If the user opens the cover at a timing when it is not necessary to replace a part, such as the developing unit and the photosensitive drum, the image forming apparatus stops image formation in progress and notifies the user to close the cover.

The cartridge storing a recording agent may be covered with the same cover as that of the above-described developing unit and photosensitive drum in some cases. In such a case, if the user intentionally opens the cover to replace the cartridge at a timing when it is not necessary to replace any of the parts, a notification prompting the user to close the cover is displayed. Thus, the user cannot check the cartridge replacement procedure.

SUMMARY

According to an aspect of the present disclosure, an image forming apparatus to form an image on a recording material using a recording agent supplied from a container detachably mounted to the image forming apparatus includes a cover configured to cover a region in which the container is stored, and one or more processors to execute processing including: receiving from a user a display instruction to display a procedure for replacing the container, causing a display unit to display the container replacing procedure based on receiving the display instruction, and performing control, wherein, in a case where it is determined that the container replacing procedure is displayed on the display unit, performing control includes performing control to prevent a notification, prompting the user to close the cover, from being issued even if the cover is opened.

Further features of the present disclosure will become apparent from the following description of exemplary embodiments with reference to the attached drawings.

BRIEF DESCRIPTION OF THE DRAWINGS

FIG. 4B illustrates an example of a screen for presenting work of opening the front cover which is displayed in the execution of optional toner replacement according to the present exemplary embodiment.

DESCRIPTION OF THE EMBODIMENTS

Exemplary embodiments of the present disclosure will be described in detail below with reference to the attached drawings.

Figure 1:
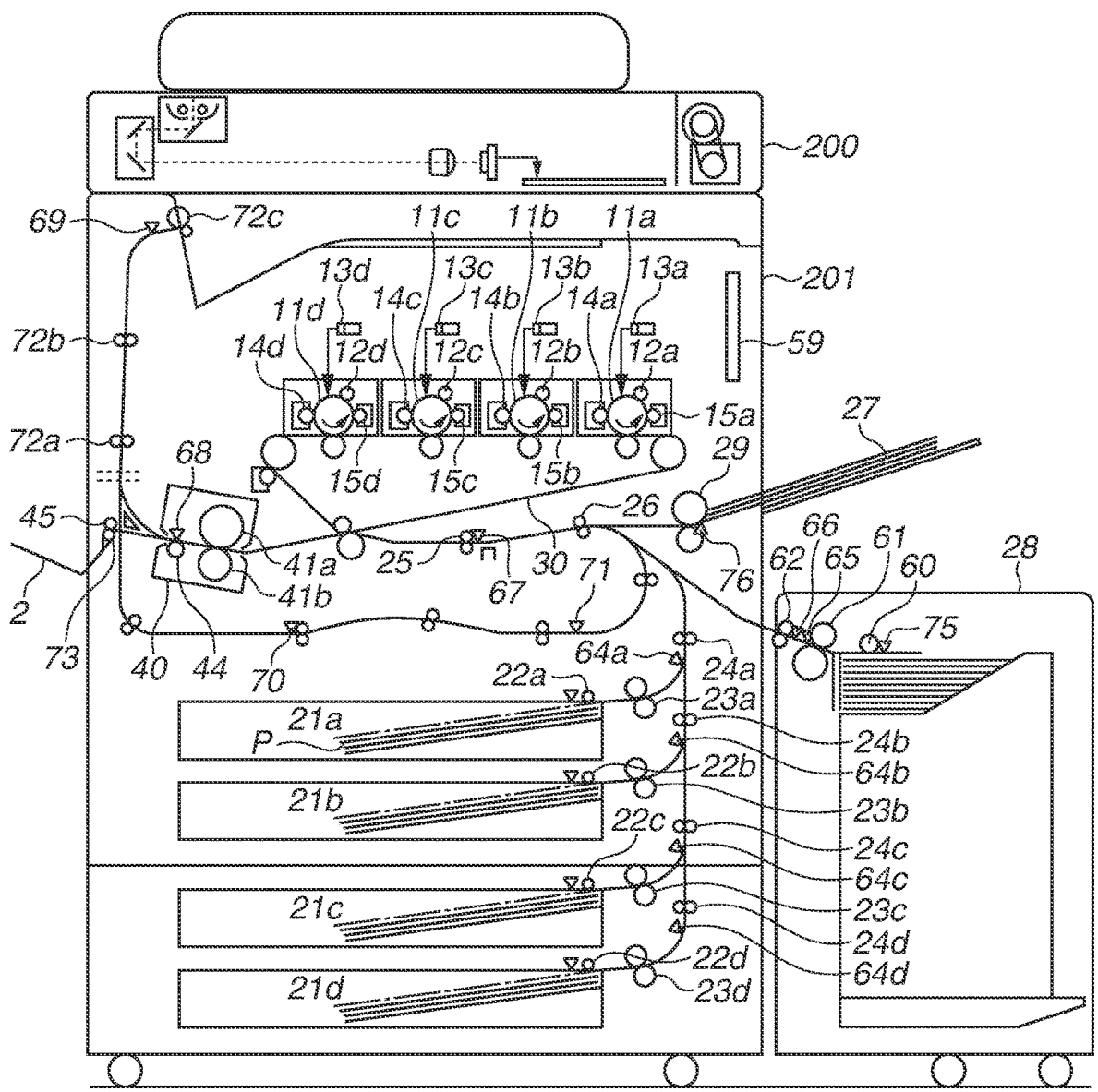
FIG. 1 illustrates an example of a section of an image forming apparatus according to an exemplary embodiment.

FIG. 1 is a sectional view of a schematic configuration of a full color copying machine which is an example of an image forming apparatus according to an exemplary embodiment of the present disclosure. As illustrated in FIG. 1, the image forming apparatus includes a digital color image reader unit (hereinbelow, referred to as a reader unit) 200 and a digital color image printer unit (hereinbelow, referred to as a printer unit) 201. In the present exemplary embodiment, the full color copying machine will be described as an example of the image forming apparatus. However, the image forming apparatus is not limited thereto and may be a single-function peripheral (SFP), a multi-function peripheral (MFP), or an ink-jet printer.

In the printer unit 201, a control unit 59 is a controller unit and is configured with a controller board including a central processing unit (CPU), a random access memory (RAM), and a read only memory (ROM). The CPU comprehensively controls operations of a sheet feed unit, an intermediate transfer unit, a conveyance unit, a fixing unit, and an operation unit based on a control program stored in the ROM.

Figure 9:
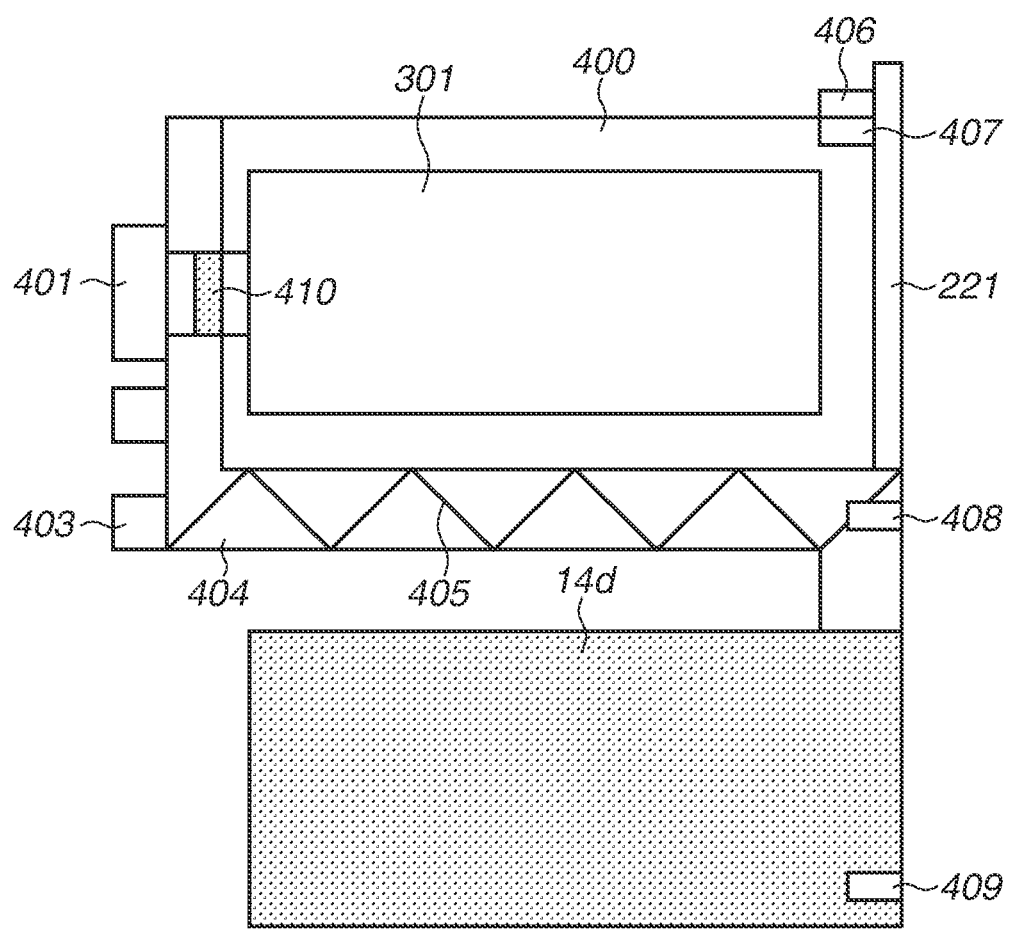
FIG. 9 is a schematic diagram illustrating an example of a relationship between the toner cartridge and a developing unit according to the present exemplary embodiment.

An image forming unit which forms an image under the control of the control unit 59 includes a configuration described below. Photosensitive drums 11a, 11b, 11c, and 11d serving as image bearing members are pivotally supported on the center thereof and rotationally driven in directions of arrows by a drive motor (not illustrated). Roller chargers 12a to 12d, scanners 13a to 13d, developing units 14a to 14d, and photosensitive drum cleaning devices 15a to 15d are arranged in a rotation direction of the photosensitive drums 11a to 11d to face outer circumferential surfaces thereof. The photosensitive drum 11a, the roller charger 12a, the scanner 13a, and the developing unit 14a are collectively referred to as a drum unit. As illustrated in FIG. 9, a toner cartridge is mounted above the drum unit.

In the configuration described above, the roller chargers 12a to 12d respectively apply a uniform amount of charge on the surfaces of the photosensitive drums 11a to 11d. The scanners 13a to 13d then respectively expose the photosensitive drums 11a to 11d with light beams, such as laser beams, modulated according to a recorded image signal and form electrostatic latent images on the photosensitive drums 11a to 11d. Further, the developing units 14a to 14d storing four color toners of black, cyan, magenta, and yellow develop the above-described electrostatic latent images. The developed visible images are transferred to an intermediate transfer member 30. Subsequently, residual toner remaining on the photosensitive drums 11a to 11d is collected by the photosensitive drum cleaning devices 15a to 15d. Image formation with each toner is sequentially performed through the above-described processes.

The sheet feed unit includes a unit which stores a recording material P, a roller for conveying the recording material P, a sensor for detecting passing of the recording material P, a sensor detecting the presence or absence of the recording material P, and a guide (not illustrated) for conveying the recording material P along a conveyance path.

Each of cassettes 21a, 21b, 21c, and 21d, a manual feed tray 27, and a deck 28 can store the recording material P. Pickup rollers 22a, 22b, 22c, and 22d each feed the recording materials P from the cassettes 21a to 21d one by one from the top. The pickup rollers 22a to 22d may feed a plurality of recording materials P, but rollers 23a, 23b, 23c, and 23d separate the recording materials one by one with reliability. The recording material P separated into only one sheet by the rollers 23a to 23d is further conveyed by drawing rollers 24a, 24b, 24c, and 24d and a pre-registration roller 26 to a registration roller 25.

The recording materials P stored in the manual feed tray 27 are separated into one sheet by a roller 29 and is conveyed by the pre-registration roller 26 to the registration roller 25. A plurality of recording materials P stored in the deck 28 is conveyed by a pickup roller 60 to a sheet feed roller 61, separated into one sheet by the sheet feed roller 61, and conveyed to a drawing roller 62. The recording material P is further conveyed by the pre-registration roller 26 to the registration roller 25.

A fixing unit 40 includes a roller 41a provided with a heat source, such as a halogen heater, therein, a roller 41b to be pressed by the roller 41a (the roller 41b may be provided with a heat source in some cases), and an inner sheet discharge roller 44 which conveys the recording material P discharged from a pair of the rollers 41a and 41b.

The recording material P conveyed to the registration roller 25 is stopped by rotational driving of a roller on an upstream side of the registration roller 25 being temporarily stopped, and the rotational driving of the upstream rollers including the registration roller 25 is resumed in synchronization with an image formation timing of the image forming unit. The recording material P is transmitted to a secondary transfer area described below.

The recording material P on which the image transferred in the secondary transfer area is fixed by the fixing unit 40 passes through the inner sheet discharge roller 44, and then a conveyance destination is switched by a switching flapper 73. In a case where the switching flapper 73 exists on a face-up sheet discharge side, the recording material P is discharged onto a face-up sheet discharge tray 2 by an outer sheet discharge roller 45.

In a case where the switching flapper 73 exists on a face-down sheet discharge side, the recording material P is conveyed in a direction of reversing rollers 72a, 72b, and 72c and discharged onto a face-down sheet discharge tray 3.

A plurality of sensors is arranged on the conveyance path of the recording material P to detect passing of the recording material P. The plurality of sensors includes, for example, sheet feed retry sensors 64a to 64d, a deck sheet feed sensor 65, a deck drawing sensor 66, a registration sensor 67, an inner sheet discharge sensor 68, a face-down sheet discharge sensor 69, a two-sided pre-registration sensor 70, and a two-sided refeed sensor 71.

The cassettes 21a to 21d storing the recording materials P are respectively provided with cassette sheet presence/absence sensor for detecting presence or absence of the recording materials P. Further, the manual feed tray 27 is provided with a manual feed tray sheet presence/absence sensor 76 for detecting presence or absence of the recording material P on the manual feed tray 27, and the deck 28 is provided with a deck sheet presence/absence sensor 75 for detecting presence or absence of the recording material P in the deck 28.

Figure 2A:
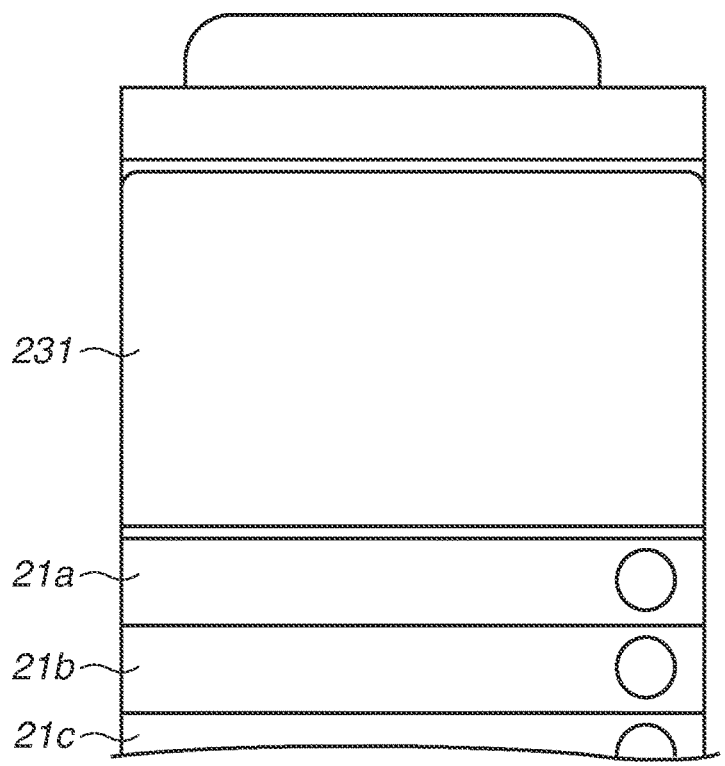
FIG. 2A illustrates an example of an external appearance of the image forming apparatus according to the present exemplary embodiment.

FIG. 2A illustrates the front of the image forming apparatus which is as an example of the image forming apparatus according to the present exemplary embodiment.

A front cover 231 covers the toner cartridge and the drum unit so that these units are not exposed. The drum unit includes the members 11 to 15.

Figure 2B:
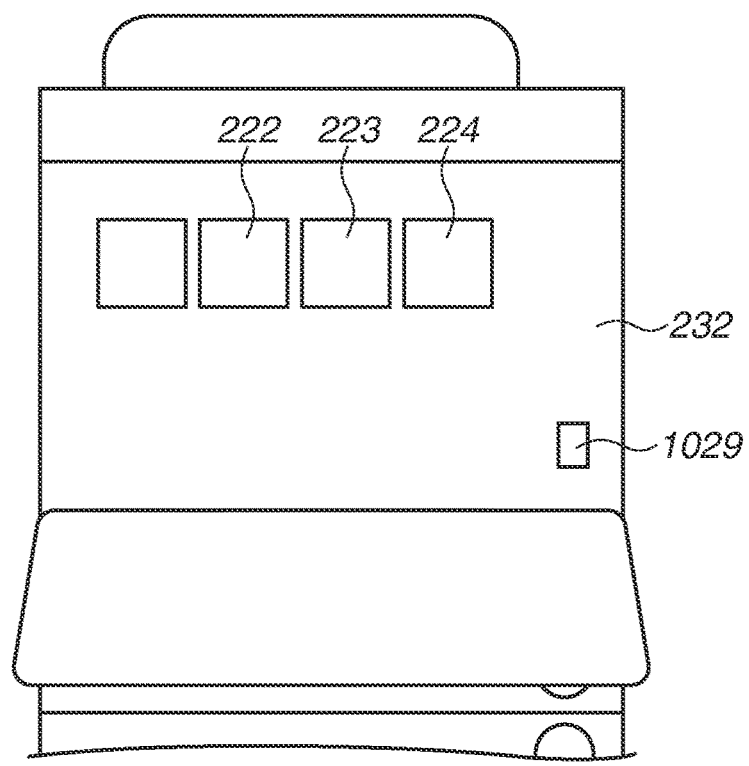
FIG. 2B illustrates an example of a configuration in a case where a front cover of the image forming apparatus according to the present exemplary embodiment is opened.

FIG. 2B illustrates an example of an external view in a case where the front cover 231 is opened.

When the front cover 231 of the image forming apparatus is opened, toner cartridge covers 221, 222, 223, and 224 arranged on locations in which the toner cartridges are stored are exposed. The toner cartridge cover 221 is a cover for a location in which yellow (Y) toner is stored. The toner cartridge cover 222 is a cover for a location in which magenta (M) toner is stored. The toner cartridge cover 223 is a cover for a location in which cyan (C) toner is stored. The toner cartridge cover 224 is a cover for a location in which black (Bk) toner is stored. The toner cartridge covers 221 to 224 are locked by a mechanical configuration, and a user cannot open the toner cartridge covers 221 to 224 in a case where they are locked. This configuration can prevent the toner cartridges from being detached at a timing other than a timing at which a user intentionally changes the toner. A drum unit cover 232 covers a location in which the drum unit including the photosensitive drum 11a, the roller charger 12a, the scanner 13a, and the developing unit 14a is stored. The drum unit cover 232 is fixed by a screw and the like. At a time of replacement, a user or an operator can replace the drum unit by loosening the screw and opening the cover.

Figure 2C:
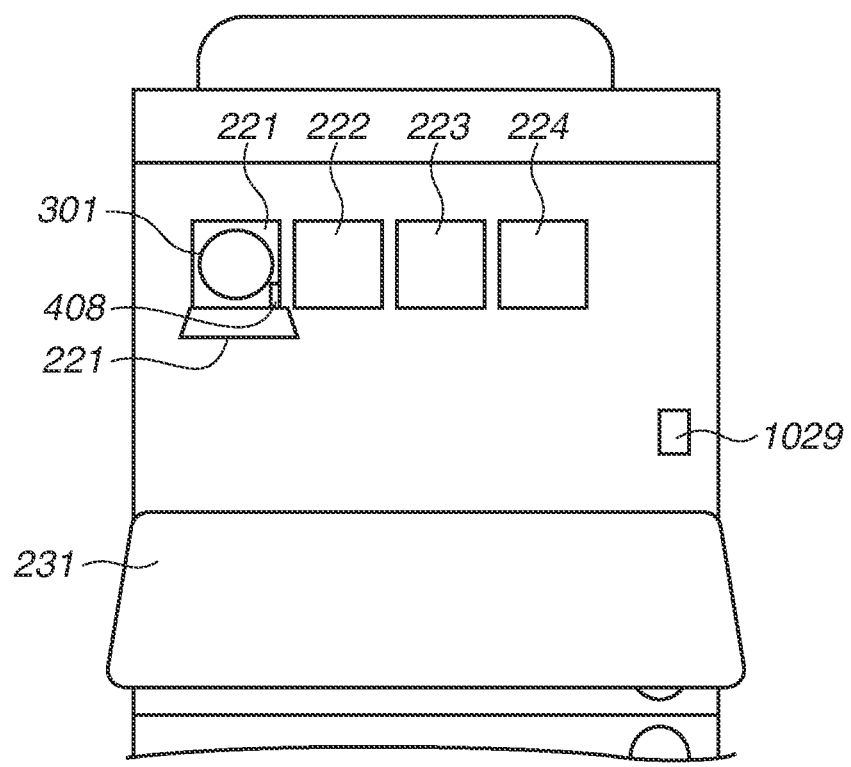
FIG. 2C illustrates an example of a configuration in a case where a toner cartridge cover according to the present exemplary embodiment is opened.

FIG. 2C illustrates an example in a case where the toner cartridge cover is opened. A toner cartridge 301 is stored inside the toner cartridge cover 221. A front cover opening/closing detection sensor 1029 detects the opening and closing of the front cover 231. In a case where the front cover opening/closing detection sensor 1029 detects that the front cover 231 is opened, the front cover opening/closing detection sensor 1029 transmits a notification to a CPU 3201. In a case where the front cover opening/closing detection sensor 1029 detects that the front cover 231 is closed, the front cover opening/closing detection sensor 1029 transmits a notification to the CPU 3201. The image forming apparatus includes a sensor (not illustrated) for detecting the opening and closing of the toner cartridge cover and detects the opening and closing of the toner cartridge cover based on an output from the sensor.

The image forming apparatus according to the present exemplary embodiment is configured to close the toner cartridge covers 221 to 224 in conjunction with closing of the front cover 231.

According to the present exemplary embodiment, processing for replenishing the drum unit with the toner from the toner cartridge will be described below with reference to FIG. 9.

FIG. 9 is a sectional view of an example of a positional relationship between the developing unit and the toner cartridge according to the present exemplary embodiment. A right side of FIG. 9 corresponds to the front of the image forming apparatus, and FIG. 9 is the sectional view of the image forming apparatus when viewed from a left side thereof. All four developing units 14a to 14d have the same configuration, so that the developing unit 14d will be described as a representative example in the following description.

A toner cartridge insertion chamber 400 is a space into which the toner cartridge is inserted. A toner cartridge cover opening/closing sensor 406 detects the opening and closing of the toner cartridge cover 221. A cartridge cover solenoid 407 is a locking mechanism for preventing the toner cartridge cover 221 from opening. An instruction to demount the toner cartridge is issued by a user operation, the lock by the cartridge cover solenoid 407 is released, and the toner cartridge cover 221 is opened. The user draws the toner cartridge 301 in a right direction in FIG. 9 and inserts a new toner cartridge into the toner cartridge insertion chamber 400. In this way, the toner cartridge is detachably mounted to the image forming apparatus.

A cartridge rotation motor 401 rotates the toner cartridge 301. If the cartridge rotation motor 401 rotates and the toner cartridge is rotated accordingly, the toner is moved to a toner supply port 410, and a hopper 404 is supplied with the toner. A screw rotation motor 403 rotates a screw 405 in the hopper 404 to feed the toner to the developing unit 14d.

An in-hopper toner detection sensor 408 adopts a piezo-electric element and detects the toner in the hopper 404. In a case where the in-hopper toner detection sensor 408 detects that there is no toner, the CPU 3201 rotates the screw rotation motor 403 for a certain period of time. In a case where the in-hopper toner detection sensor 408 does not detect the toner after rotation of the screw rotation motor 403 for the certain period of time, the CPU 3201 detects that there is no toner in the toner cartridge.

A sensor 409 detects a toner remaining amount in the developing unit 14d.

Figure 3:
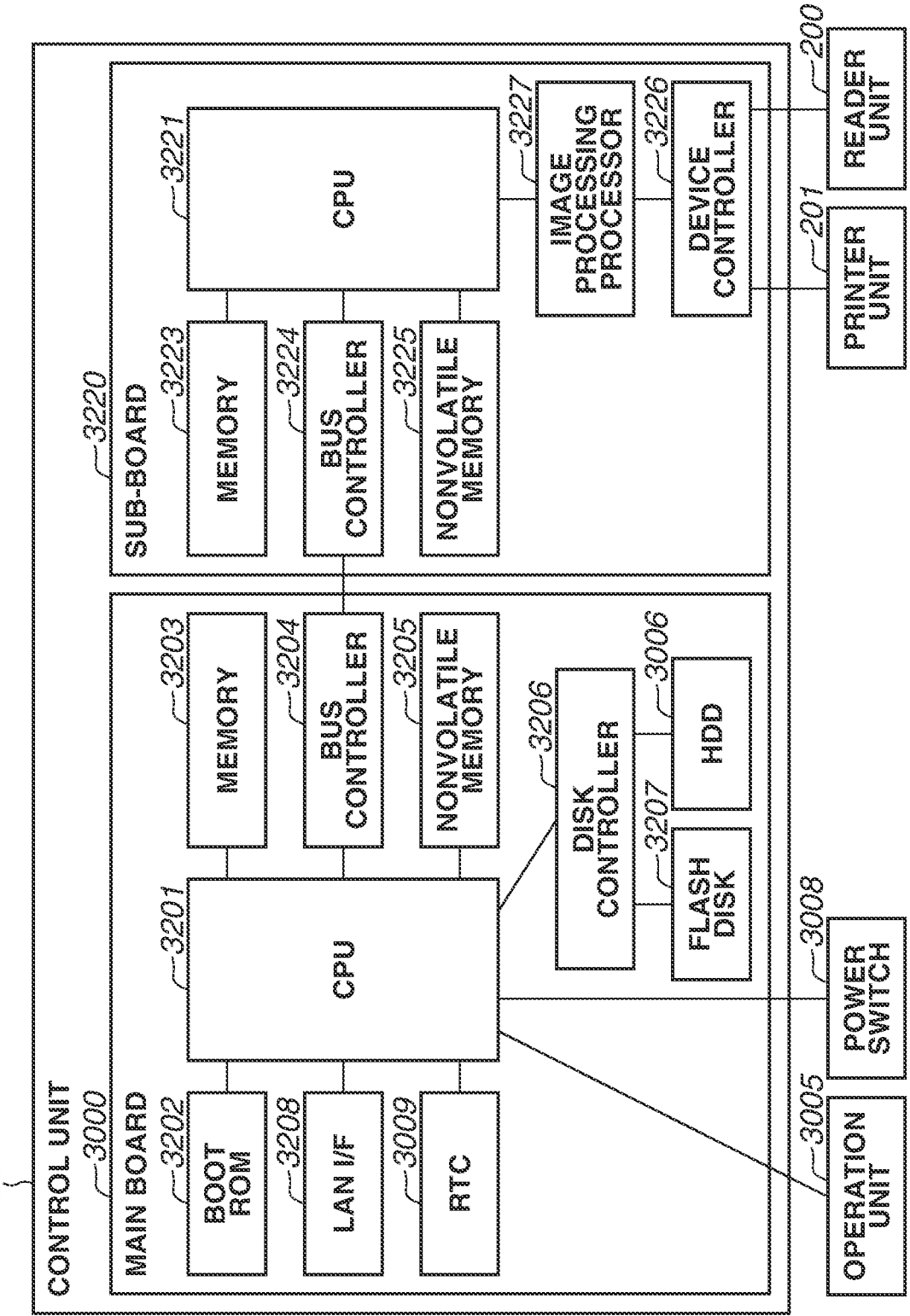
FIG. 3 illustrates an example of hardware blocks of the image forming apparatus according to the present exemplary embodiment.

FIG. 3 is a block diagram illustrating the controller board of the image forming apparatus according to the present exemplary embodiment.

The control unit 59 performs job control for image formation, and includes a main board 3000 and a sub-board 3220.

The main board 3000 functions as a general computer. The main board 3000 includes the CPU 3201 which entirely controls the main board and a boot ROM 3202 which includes a boot program. The main board 3000 includes a memory 3203 which is used as a work memory by the CPU 3201 and a bus controller 3204 having the function of performing bridging with an external bus. The main board 3000 further includes a nonvolatile memory 3205 and a disk controller 3206 which controls a storage device. The CPU 3201 is connected to a flash disk 3207 and a hard disk drive (HDD) 3006 used as an auxiliary storage device via the disk controller 3206. The main board 3000 includes a local area network interface (LAN I/F) 3208 for connecting to the outside through the network and a real time clock (RTC) 3009 for controlling time. Further, the main board 3000 is connected to an operation unit 3005, a power switch 3008, and the like. The operation unit 3005 which includes a liquid crystal display unit having a touch panel function and various hard keys functions as a display unit for displaying information and a reception unit for receiving a user instruction. According to the present exemplary embodiment, the operation unit 3005 is used for displaying a screen for instructing execution of optional toner replacement and a screen for instructing the opening or closing of the toner cartridge cover. The power switch 3008 is used for inputting power to the image forming apparatus.

The sub-board 3220 is a sub-system including a relatively small general CPU system and an image processing hardware device. The sub-board 3220 includes a CPU 3221, which entirely controls the sub-board, and a memory 3223 which is used as a work memory by the CPU 3221. The sub-board 3220 includes a bus controller 3224 having the function of performing bridging with an external bus, a nonvolatile memory 3225, an image processing processor 3227 that executes image processing, and a device controller 3226. According to the present exemplary embodiment, the device controller 3226 controls the printer unit 201 and the reader unit 200.

The reader unit 200 optically scans a document, converts the scanned image into a digital image, and transmits the converted image data to the device controller 3226 as described above. The printer unit 201 prints the image data on a sheet which is fed as described above.

FIG. 3 illustrates merely an example of the configuration of the control unit 59, and the control unit 59 may include a module different from the modules illustrated in FIG. 3 and may not include a part of the modules illustrated in FIG. 3.

A method for optional toner replacement by which the user replaces a toner container at an optional timing according to the present exemplary embodiment will be described below with reference to FIGS. 4A, 4B, and 4C. Generally, in a case where the toner remaining amount in the toner cartridge is less than a predetermined value, the image forming apparatus notifies a user that the toner cartridge needs to be replaced. If the user checks the notification and operates the operation unit, the toner cartridge replacement procedure is displayed on the operation unit. The optional toner replacement is the function of replacing the toner cartridge at a timing at which the toner remaining amount in the toner cartridge is more than the predetermined value and the notification that the toner cartridge needs to be replaced is not issued. The function is used, for example, in a case where a service person temporarily replaces the toner cartridge for maintenance or in a case where a user replaces the toner cartridge in advance before performing a large amount of printing in order to prevent the toner from running out in the middle of printing.

Figure 4A:
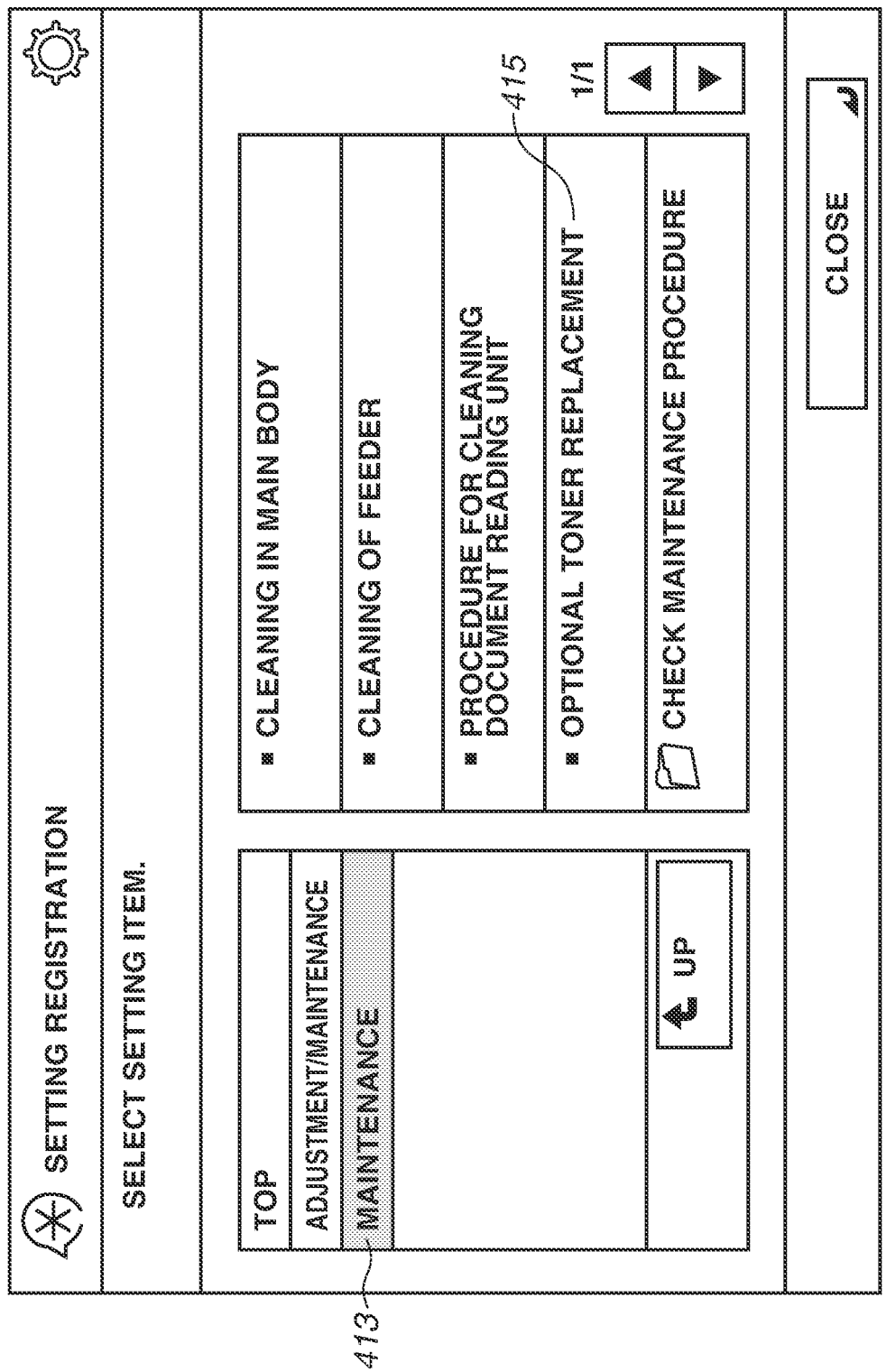
FIG. 4A illustrates an example of a screen for instructing execution of optional toner replacement according to the present exemplary embodiment.
Figure 4C:
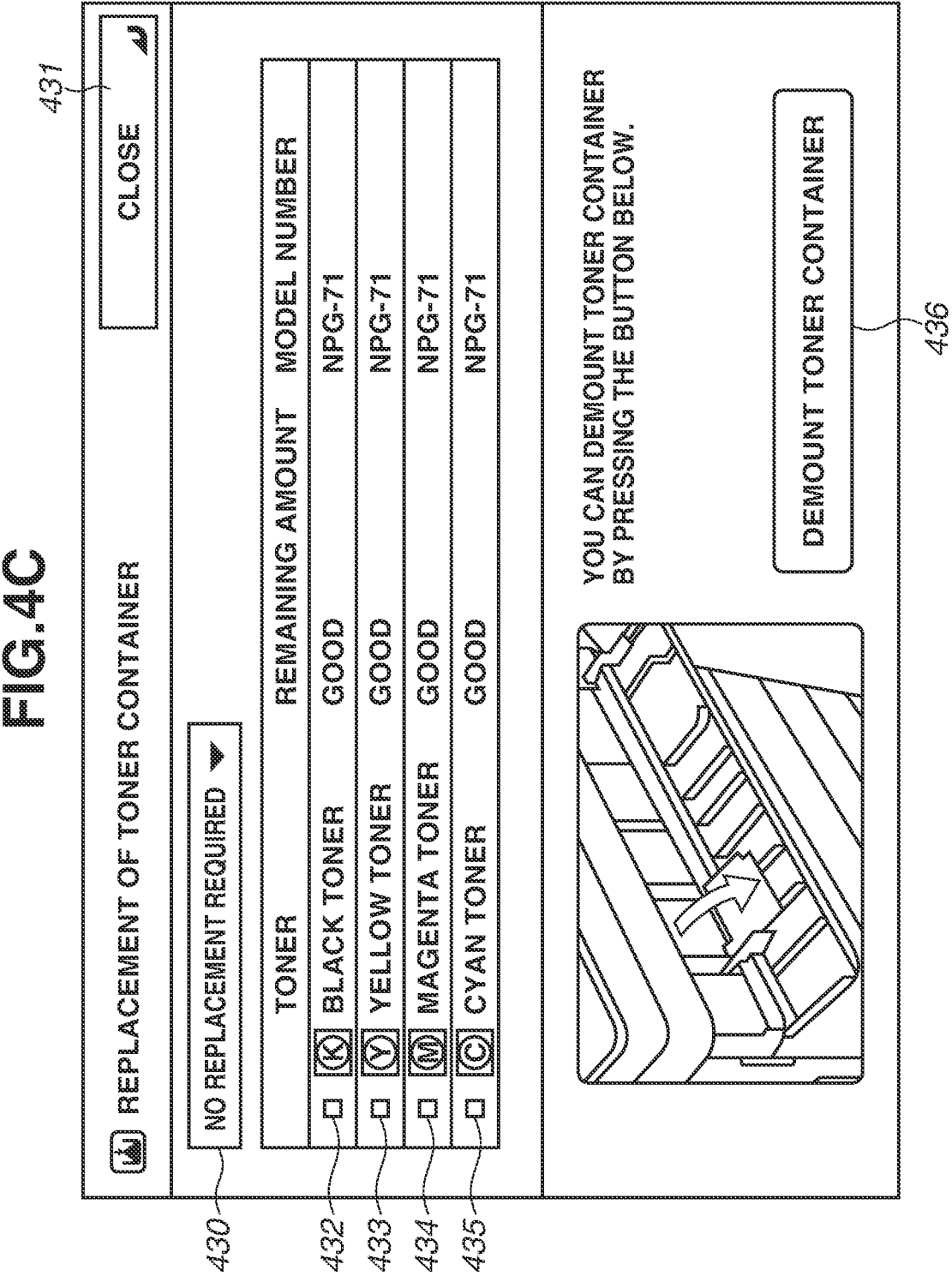
FIG. 4C illustrates an example of a screen for selecting a toner cartridge to be replaced according to the present exemplary embodiment.

FIGS. 4A, 4B, and 4C illustrate examples of screens which are displayed on the operation unit 3005 at the time of the optional toner replacement. Processing in a case where a user performs operation will be described below with reference to flowcharts.

The user presses a setting/registration button (not illustrated), which is a hard key or a software key, on the operation unit 3005. If the user selects a maintenance menu from a screen (not illustrated), a menu screen illustrated in FIG. 4A is displayed on the operation unit 3005. If the user selects "optional toner replacement" 415 on the menu screen, a toner container replacement screen illustrated in FIG. 4B is displayed. The toner container replacement screen indicates a procedure for work which is performed by the user for the optional replacement of the toner cartridge. In FIG. 4B, work to open the front cover is displayed first. The toner container replacement screen instructs the user to select the toner cartridge to be replaced by operating the operation unit 3005 after opening the front cover 231. A "close" button 421 is used to close the toner container replacement screen and to terminate the optional toner replacement.

If the user opens the front cover 231, a screen as illustrated in FIG. 4C is displayed. FIG. 4C illustrates a screen on which the user selects the toner cartridge to be replaced and issues an instruction to open the toner cartridge cover. In a region 430, a list of toner containers which can be replaced is displayed. The user selects a key (432, 433, 434, or 435) corresponding to the toner cartridge to be replaced. If the user selects the key, the key is displayed with the color thereof changed, so that the user can recognize that the corresponding toner cartridge is selected as a replacement target.

After selecting the toner cartridge to be replaced, the user presses a "demount toner container" button 436. If the user selects the "demount toner container" button 436, the lock of the toner cartridge cover (221, 222, 223, or 224) in which the toner container designated by the user is stored is released, and the toner cartridge cover is opened. After the toner cartridge cover is opened, the image forming apparatus displays work necessary for replacement of the toner cartridge on the operation unit 3005. The user draws the toner cartridge, inserts another toner cartridge of the same color, and closes the toner cartridge cover and the front cover 231 while referring to a toner replacement procedure screen (not illustrated) displayed on the operation unit 3005. The user's operation is completed in this way, and after the front cover 231 is closed, the image forming apparatus performs a toner replenishment operation and prepares for printing. The foregoing is the description of the operation at the time of the optional toner replacement.

Next, processing which is performed in the image forming apparatus will be described.

Figure 5A:
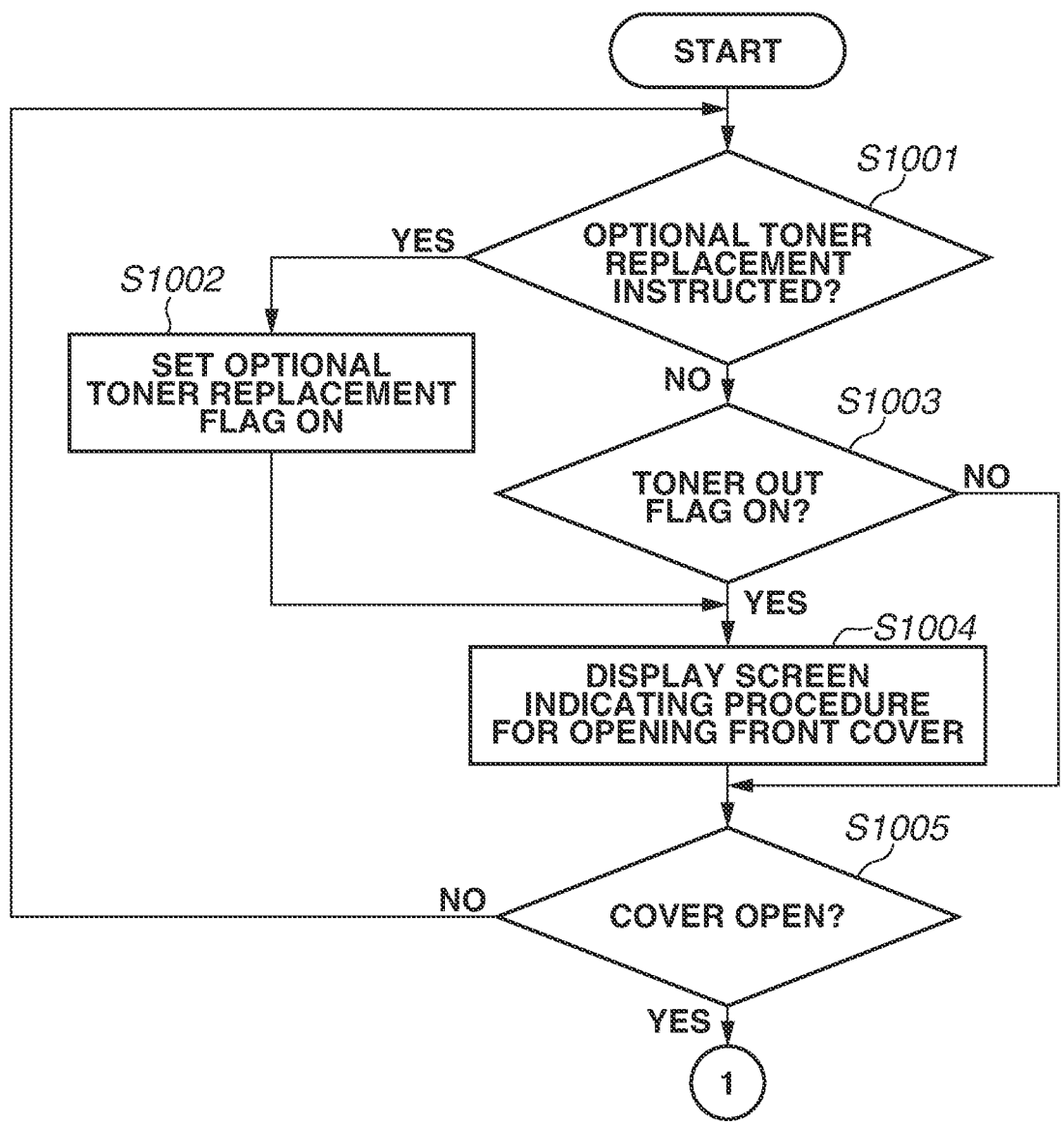
FIGS. 5A and 5B are flowcharts illustrating an example of processing for replacing a toner cartridge according to the present exemplary embodiment.
Figure 5B:
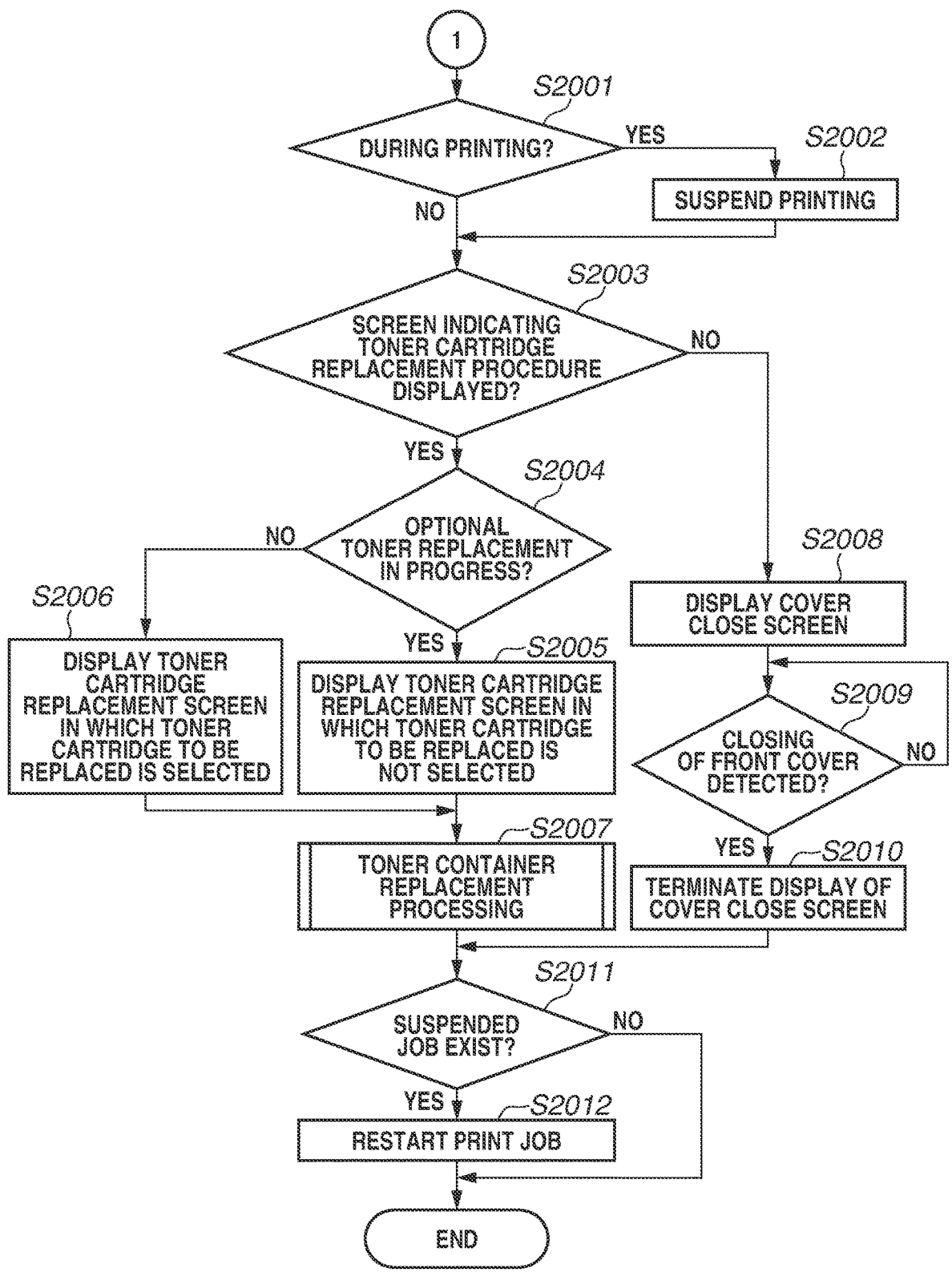

FIGS. 5A and 5B are flowcharts illustrating processing of replacing the toner container which is performed by the CPU 3201 at the time of the optional toner replacement. The processing described in the present flowchart is realized by the CPU 3201 executing a program loaded to the memory 3203. The processing illustrated in FIGS. 5A and 5B is repeatedly executed after the power source of the image forming apparatus is turned on and until the power source is turned off.

In step S1001 in FIG. 5A, the CPU 3201 determines whether the optional toner replacement is instructed. The CPU 3201 determines whether a user selects "optional toner replacement" 415 on the screen illustrated in FIG. 4A. In a case where the "optional toner replacement" 451 is selected (YES in step S1001), the CPU 3201 advances the processing to step S1002. In a case where the "optional toner replacement" 451 is not selected (NO in step S1001), the CPU 3201 advances the processing to step S1003.

In step S1002, the CPU 3201 sets an optional toner replacement flag ON. The optional toner replacement flag is stored in the memory 3203 and the like.

In step S1003, the CPU 3201 determines whether a toner OUT flag is ON. In a case where the toner OUT flag is ON (YES in step S1003), the CPU 3201 executes an operation in step S1004. Ina case where the toner OUT flag is not ON (NO in step S1003), the CPU 3201 executes an operation in step S1005.

Figure 8:
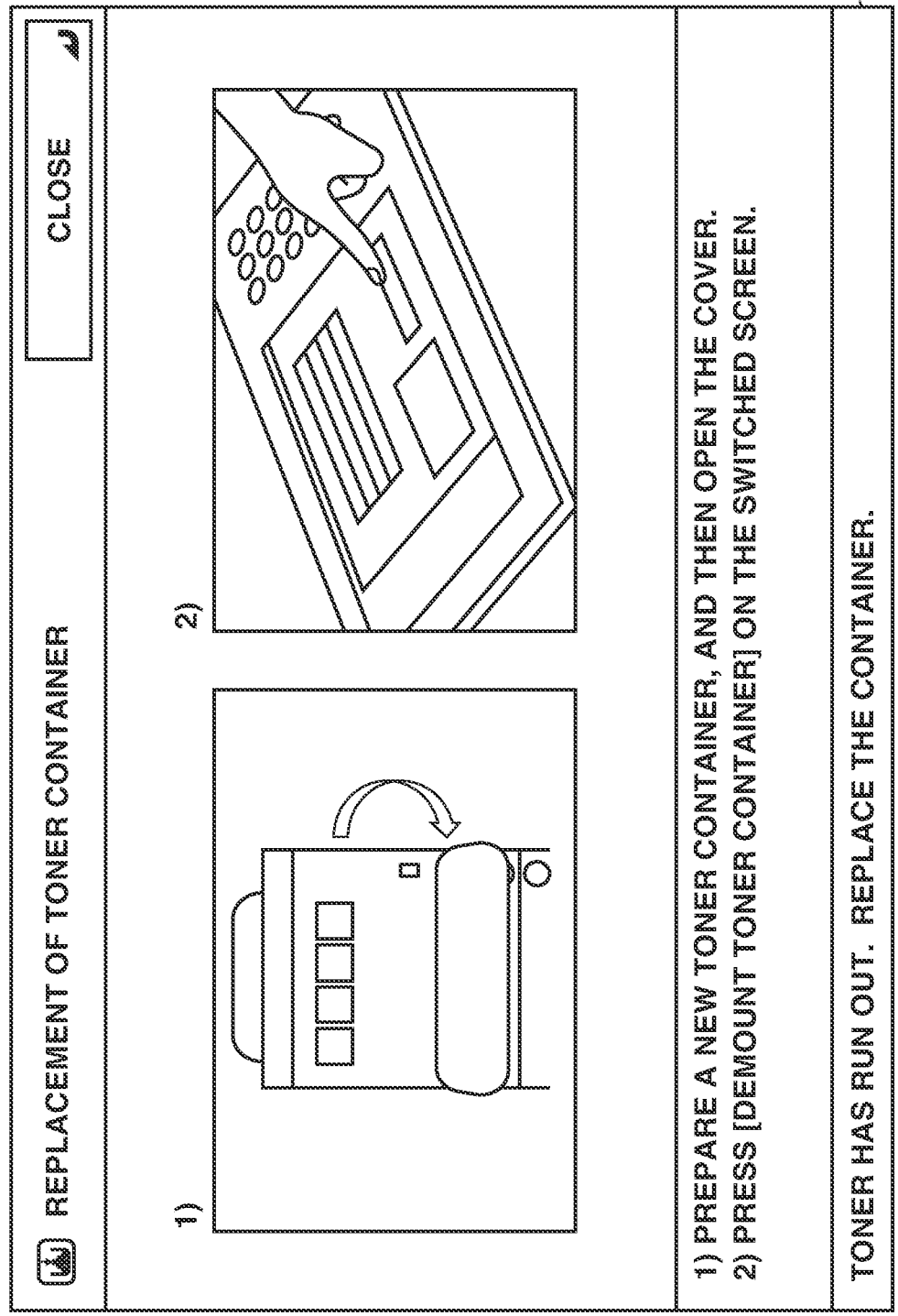
FIG. 8 illustrates an example of a screen to be displayed in a case where toner runs out according to the present exemplary embodiment.

In step S1004, the CPU 3201 displays a screen indicating a procedure for opening the front cover to replace the toner cartridge. In a case where the optional toner replacement is to be executed, the CPU 3201 displays the screen illustrated in FIG. 4B on the operation unit 3005. In a case where the screen indicating the procedure for opening the front cover for replacement of the toner cartridge is displayed in response to running out of the toner, the CPU 3201 displays a screen as illustrated in FIG. 8. In FIG. 8, a status line 901 indicates that the toner has run out, and replacement of the toner cartridge is required.

In step S1005, the CPU 3201 determines whether the front cover 231 is opened. The CPU 3201 determines whether the front cover opening/closing detection sensor 1029 performs notification that the front cover 231 is opened. In a case where the opening of the front cover 231 is not notified (NO in step S1005), the CPU 3201 returns the processing to step S1001. In a case where the opening of the front cover 231 is notified (YES in step S1005), the CPU 3201 executes processing illustrated in FIG. 6.

In step S2001, the CPU 3201 determines whether a print job is being executed. In a case where the print job is not being executed (NO in step S2001), the CPU 3201 advances the processing to step S2003. In a case where the print job is being executed (YES in step S2001), in step S2002, the CPU 3201 stops an operation of the printer unit 201 and sets a status of the print job being executed to suspension.

In step S2003, the CPU 3201 determines whether a screen being displayed on the operation unit 3005 is the screen indicating the toner cartridge replacement procedure illustrated in FIG. 4B. The CPU 3201 makes the determination in step S2003 based on, for example, whether a screen identification (ID) displayed on the operation unit 3005 is a screen ID of the screen illustrated in FIG. 4B. The screen ID is identification information about a screen for identifying the screen being displayed. In addition, in a case where the screen indicating the toner cartridge replacement procedure is displayed on the operation unit 3005 in step S1004, a flag may be set to ON and stored in the memory 3203, and the CPU 3201 may make a determination in step S2003 based on whether the flag is ON.

Figure 7:
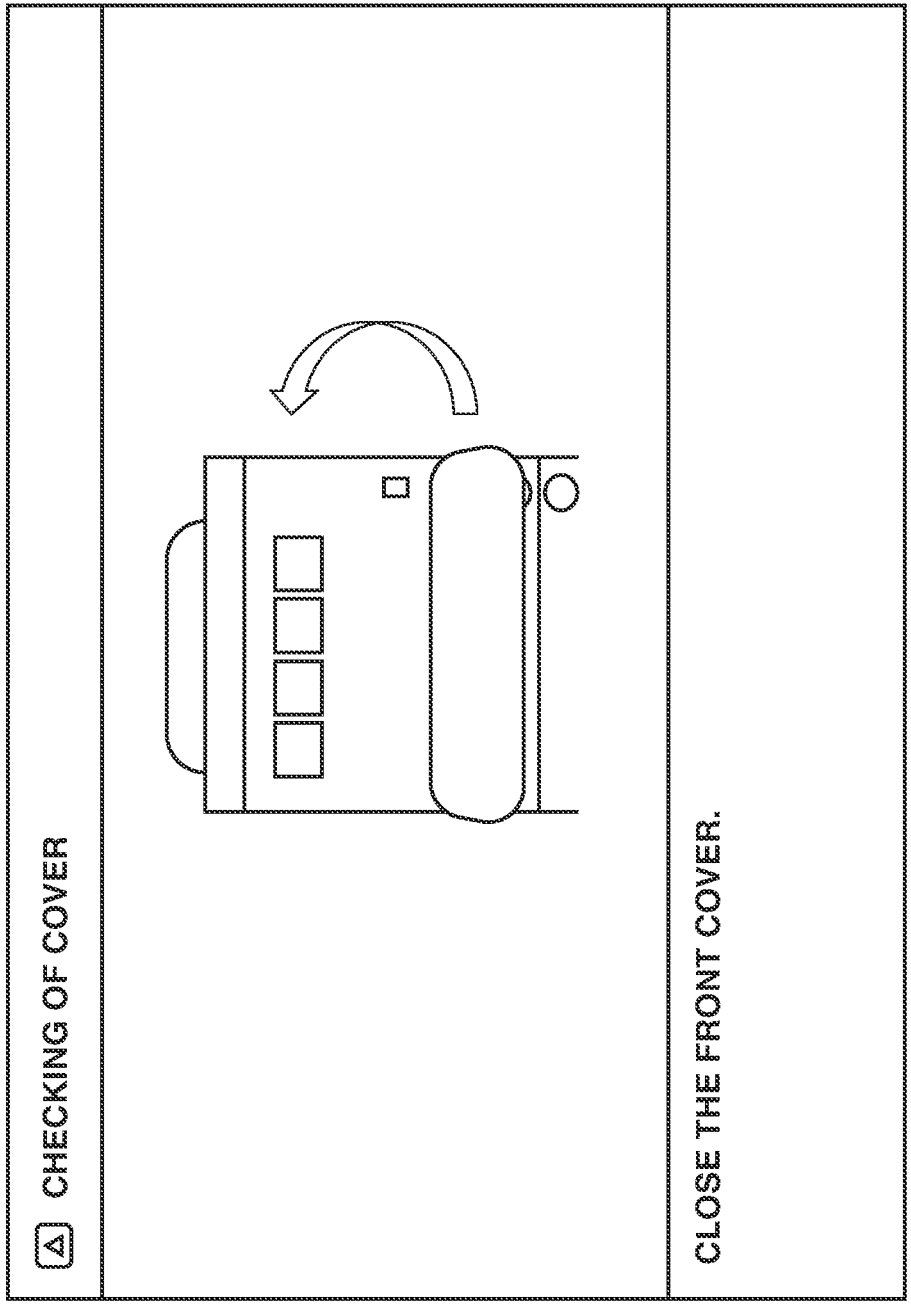
FIG. 7 illustrates an example of a cover close screen according to the present exemplary embodiment.

In a case where the screen indicating the toner cartridge replacement procedure is not displayed (NO in step S2003), the processing proceeds to step S2008. In step S2008, the CPU 3201 displays a cover close screen illustrated in FIG. 7. The cover close screen notifies a user to close the front cover 231. The cover close screen illustrates in FIG. 7 continues to be displayed until the user closes the front cover 231. Thus, the user cannot perform an operation using the operation unit 3005 until the user closes the front cover 231. In other words, the user cannot issue an instruction for the optional toner replacement while the screen in FIG. 7 is being displayed.

In step S2009, the CPU 3201 determines whether the closing of the front cover 231 is detected. The CPU 3201 advances the processing to step S2010 based on a fact that the front cover opening/closing detection sensor 1029 detects that the front cover 231 is closed (YES in step S2009). The cover close screen continues to be displayed until the closing of the front cover 231 is detected.

In step S2010, the CPU 3201 terminates the display of the cover close screen. After terminating the display of the cover close screen, the CPU 3201 displays a screen which has been displayed immediately before the cover close screen is displayed on the operation unit 3005.

In step S2003, in a case where it is determined that the screen indicating the toner cartridge replacement procedure is displayed (YES in step S2003), the processing proceeds to step S2004. In step S2004, the CPU 3201 determines whether the optional toner replacement is in progress. The CPU 3201 makes the determination in step S2004 based on whether the optional toner replacement flag which is set ON in step S1002 is ON. In a case where the optional toner replacement flag is ON (YES in step S2004), the CPU 3201 advances the processing to step S2005. In a case where the optional toner replacement flag is OFF (NO in step S2004), the processing proceeds to step S2006, and the CPU 3201 executes processing in step S2006.

In step S2005, the CPU 3201 displays a toner cartridge replacement screen illustrated in FIG. 4C in a state in which the toner cartridge to be replaced is not selected. The user selects the toner cartridge to be replaced on the screen illustrated in FIG. 4C. When the user selects the toner cartridge to be replaced, the "demount toner container" button 436 is displayed in a selectable state.

In a case where the optional toner replacement flag is OFF (NO in step S2004), in step S2006, the CPU 3201 displays the toner cartridge replacement screen in a state in which the toner cartridge to be replaced is selected. The screen to be displayed in step S2006 is a screen corresponding to the screen, illustrated in FIG. 4C, in a state in which the toner cartridge to be replaced has been selected.

In step S2007, the CPU 3201 performs toner container replacement processing. The processing in step S2007 will be described below with reference to FIG. 6.

In step S2011, the CPU 3201 determines whether there is a job of which a status is set to suspension. In a case where there is a job being executed when the front cover is opened, the job is suspended in step S2002. If such a job exists, the CPU 3201 determines that there is the job of which the status is suspension. In a case where the suspended job exists (YES in step S2011), the processing proceeds to step S2012. In step S2012, the CPU 3201 sets the status of the suspended job to "during execution" and restarts the print job. In a case where there is no job of which the status is suspension (NO in step S2011), the CPU 3201 terminates the processing described in the present flowchart. In this way, according to the present exemplary embodiment, the image forming apparatus does not perform image formation while the front cover 231 is open. This is because, while the front cover 231 is open, a user may replace a part relating to image formation, such as the drum unit.

Figure 6:
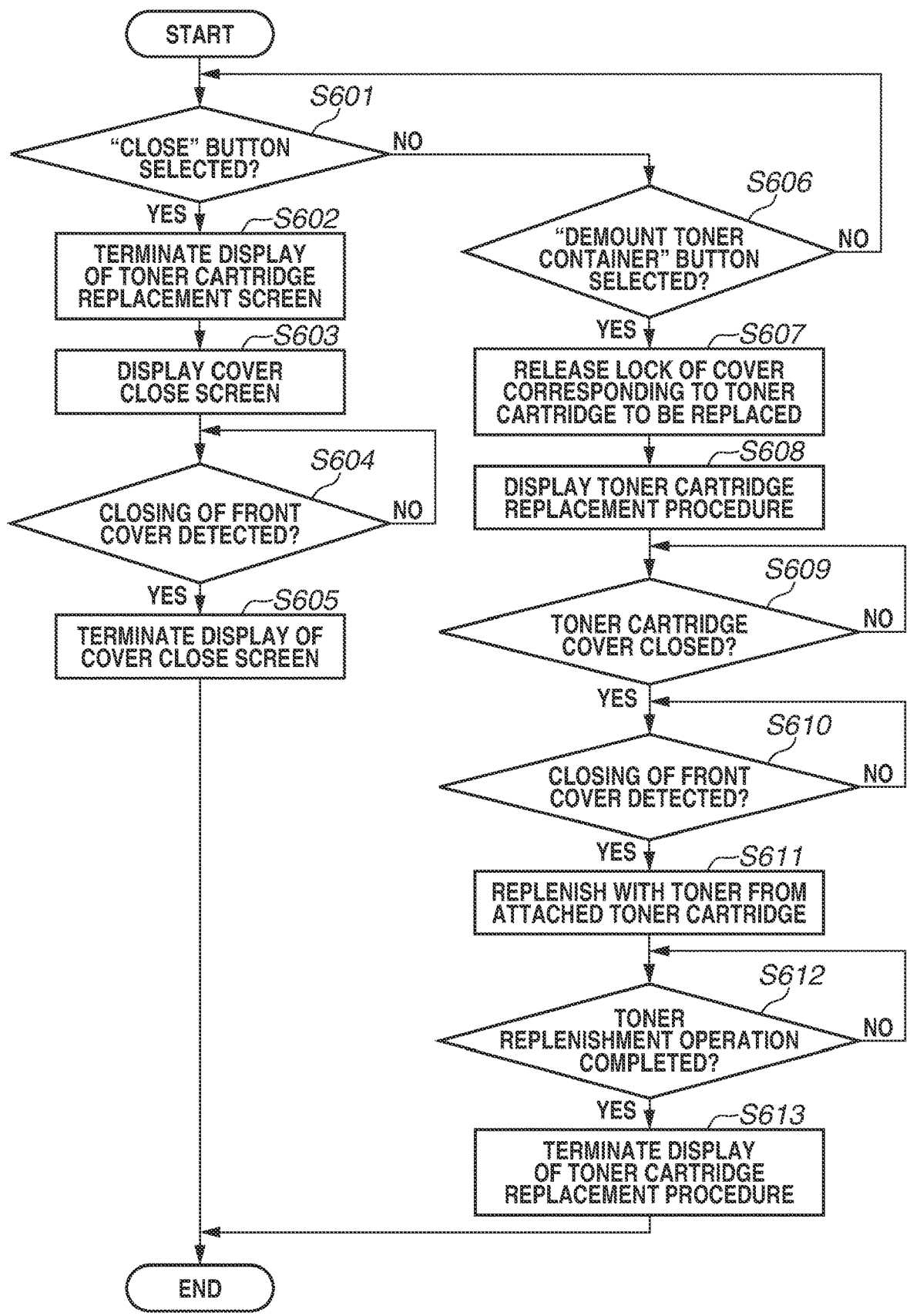
FIG. 6 is a flowchart illustrating an example of processing which is executed in association with replacement of the toner cartridge according to the present exemplary embodiment.

FIG. 6 is a flowchart illustrating the toner container replacement. FIG. 6 illustrates processing in step S2007 in FIG. 5B in detail. The processing described in the present flowchart is realized by the CPU 3201 executing a program loaded to the memory 3203.

In step S601, the CPU 3201 determines whether a "close" button 431 on the screen for selecting the toner cartridge to be replaced illustrated in FIG. 4C or a close button on a screen (not illustrated) for opening the cover of the toner cartridge to be replaced is selected.

In a case where the CPU 3201 determines that the "close" button 431 is selected (YES in step S601), the processing proceeds to step S602. In step S602, the CPU 3201 terminates display of the toner cartridge replacement screen. In step S603, the CPU 3201 displays the cover close screen illustrated in FIG. 7 on the operation unit 3005.

In step S604, the CPU 3201 determines whether the closing of the front cover 231 is detected. When the user closes the front cover 231, the front cover opening/closing detection sensor 1029 notifies the CPU 3201 that the front cover 231 is closed. The CPU 3201 receives the notification from the front cover opening/closing detection sensor 1029 and detects that the front cover 231 is closed (YES in step S604). In a case where the notification is not received from the front cover opening/closing detection sensor 1029, the CPU 3201 determines that the closing of the front cover 231 is not detected (NO in step S604).

In step S605, the CPU 3201 terminates the display of the cover close screen illustrated in FIG. 7.

In step S601, in a case where the CPU 3201 determines that the "close" button 431 on the toner cartridge replacement screen illustrated in FIG. 4C is not selected (NO in step S601), the processing proceeds to step S606. In step S606, the CPU 3201 determines whether the "demount toner container" button 436 is selected. In a case where it is determined that the "demount toner container" button 436 is not selected (NO in step S606), the CPU 3201 returns the processing to step S601. In a case where it is determined that the "demount toner container" button 436 is selected (YES in step S606), the processing proceeds to step S607. In step S607, the CPU 3201 releases the lock of the toner cartridge cover corresponding to the toner cartridge selected on the toner cartridge replacement screen. In this way, the toner cartridge cover is opened as illustrated in FIG. 2C, and the user can demount the toner cartridge from the image forming apparatus.

In step S608, the CPU 3201 displays the toner replacement procedure screen (not illustrated) on the operation unit 3005. The toner cartridge replacement procedure includes, for example, a procedure of work to remove a cap of a new toner cartridge and a procedure indicating how to mount the toner cartridge.

In step S609, the CPU 3201 determines whether the toner cartridge cover is closed. The detection in step S609 may be performed by a physical switch, an optical switch, or the like.

In step S610, the CPU 3201 determines whether the front cover 231 is closed. If the front cover 231 is closed, the front cover opening/closing detection sensor 1029 notifies the CPU 3201 that the front cover 231 is closed. The CPU 3201 receives the notification from the front cover opening/closing detection sensor 1029 and determines that the front cover 231 is closed (YES in step S610). In a case where the front cover 231 is not closed (NO in step S610), the CPU 3201 continues the processing described in step S610. According to the present exemplary embodiment, the CPU 3201 separately detects that the toner cartridge cover is closed and that the front cover is closed. In a case where the image forming apparatus is configured so that the toner cartridge cover is closed if the front cover of the image forming apparatus is closed, the CPU 3201 may determine only whether the front cover is closed without performing the operation in step S609. The image forming apparatus that performs the operation in step S610 without performing the operation in step S609 may not include a sensor for detecting the opening and closing of the toner cartridge cover.

In step S611, the CPU 3201 performs a toner replenishment operation from the mounted toner cartridge. The toner replenishment operation is, for example, processing for replenishing the developing unit with the toner from the toner cartridge by rotating the screw rotation motor 403 for a predetermined time.

In step S612, the CPU 3201 determines whether the toner replenishment operation is completed. In a case where it is determined that the toner replenishment operation is completed (YES in step S612), the processing proceeds to step S613. In step S613, the CPU 3201 terminates the display of the screen indicating the toner cartridge replacement procedure.

As described above, according to the present exemplary embodiment, in a case where a user opens the front cover at a timing at which replacement of the toner cartridge is not desired, a warning screen for checking the front cover is displayed. The above-described warning screen can be set so as not to be displayed in a case where the toner runs out or a case where the front cover is opened for the optional toner replacement. Thus, a screen for toner replacement can be displayed instead of the above-described warning screen, and a user can issue an instruction to open the toner cartridge cover or check a work procedure of the toner cartridge replacement.

Other Exemplary Embodiment

According to the present disclosure, even if a user opens the cover in order to replace the toner cartridge at an optional timing, a notification prompting the user to close the cover prevents a work procedure for replacing the toner cartridge from being hidden.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-191580, filed Oct. 18, 2019, which is hereby incorporated by reference herein in its entirety.

What is claimed is:

1. An image forming apparatus to form an image on a recording material using a recording agent supplied from a container detachably attached to the image forming apparatus, the image forming apparatus comprising:
    a cover configured to be opened by a user for detaching the attached container and to be closed by the user to cover modules that include the attached container;
    a memory; and
    a controller including a processor, wherein the controller is configured to perform operations including:
    notifying the user to close the cover in a case that the cover is open in a situation where any error does not occur that requires the cover to be opened to recover from the error in the modules covered by the cover and the recording agent is remaining in the attached container; and
    causing the memory to store identification information of a screen being displayed on a display unit,
    wherein the controller does not notify, on a basis that the identification information stored in the memory is predetermined identification information, the user to close the cover at least during a period between opening the cover to detach the attached container and detaching the attached container in the situation where any error does not occur that requires the cover to be opened to recover from the error in the modules covered by the cover and the recording agent is remaining in the attached container.

2. The image forming apparatus according to claim 1, further comprising a sensor configured to detect whether the cover is open,
    wherein, in a case where the sensor detects that the cover is open in the situation where any error does not occur that requires the cover to be opened to recover from the error in the modules covered by the cover and the recording agent is remaining in the attached container, the controller notifies the user to close the cover.

3. The image forming apparatus according to claim 1, wherein, in a case where an amount of the recording agent contained in the attached container is less than a predetermined threshold value, the controller notifies the user of a request to replace the attached container.

4. The image forming apparatus according to claim 3, wherein, in a case where a predetermined user operation is received in a situation where the request to replace the attached container is notified, the controller causes the display unit to display a procedure to detach the attached container.

5. The image forming apparatus according to claim 4, wherein the predetermined user operation is an operation of opening the cover.

6. The image forming apparatus according to claim 3, wherein detaching the attached container is allowed based on a predetermined user instruction, even if the amount of the recording agent contained in the attached container is not less than the predetermined threshold value.

7. The image forming apparatus according to claim 3, wherein the situation where the recording agent is remaining in the attached container is a situation where the amount of the recording agent contained in the attached container is not less than the predetermined threshold value.

8. The image forming apparatus according to claim 1, further comprising a printer configured to print the image on the recording material,
wherein the printer stops printing the image in a case where the cover is open while the printer is printing the image.

9. The image forming apparatus according to claim 8, wherein the printer starts the stopped printing based on the open cover being closed.

10. The image forming apparatus according to claim 8, wherein the printer does not print the image while the cover is open.

11. The image forming apparatus according to claim 1, wherein the recording agent is toner or ink.

12. The image forming apparatus according to claim 1, wherein the modules include a drum unit.

13. The image forming apparatus according to claim 12, wherein the drum unit is detachably attached to the image forming apparatus.

14. The image forming apparatus according to claim 1, wherein the screen indicates information regarding detaching of the attached container at least during a period between opening the cover to detach the attached container and detaching the attached container.

15. The image forming apparatus according to claim 14, wherein the information regarding detaching of the attached container is one or more procedures of detaching the attached container.

16. The image forming apparatus according to claim 15, wherein the one or more procedures are displayed on the display unit in accordance with a user instruction for detaching the attached container.

17. A method for an image forming apparatus to form an image on a recording material using a recording agent supplied from a container detachably attached to the image forming apparatus, wherein the image forming apparatus includes a cover configured to be opened by a user for detaching the attached container and to be closed by the user to cover modules that include the attached container, the method comprising:
storing identification information indicating a screen being displayed on a display unit in a memory; and
notifying the user to close the cover in a case that the cover is open in a situation where any error does not occur that requires the cover to be opened to recover from the error in the modules covered by the cover and the recording agent is remaining in the attached container,
wherein the controller does not notify, on a basis that the identification information stored in the memory is predetermined identification information, the user to close the cover at least during a period between opening the cover to detach the attached container and detaching the attached container in the situation where any error does not occur that requires the cover to be opened to recover from the error in the modules covered by the cover and the recording agent is remaining in the attached container.

18. The method according to claim 17, further comprising detecting whether the cover is open,
wherein, in a case where detecting includes detecting that the cover is open in the situation where any error does not occur that requires the cover to be opened to recover from the error in the modules covered by the cover and the recording agent is remaining in the attached container, notifying includes notifying the user to close the cover.

19. A non-transitory computer-readable storage medium storing a program to cause a computer to perform a method for an image forming apparatus to form an image on a recording material using a recording agent supplied from a container detachably attached to the image forming apparatus, wherein the image forming apparatus includes a cover configured to be opened by a user for detaching the attached container and to be closed by the user to cover modules that include the attached container, the method comprising:
storing identification information indicating a screen being displayed on a display unit in a memory; and
notifying the user to close the cover in a case that the cover is open in a situation where any error does not occur that requires the cover to be opened to recover from the error in the modules covered by the cover and the recording agent is remaining in the attached container,
wherein the controller does not notify, on a basis that the identification information stored in the memory is predetermined identification information, the user to close the cover at least during a period between opening the cover to detach the attached container and detaching the attached container in the situation where any error does not occur that requires the cover to be opened to recover from the error in the modules covered by the cover and the recording agent is remaining in the attached container.

* * * * *